US 8,125,902 B2

(12) United States Patent
Rochon et al.

(10) Patent No.: US 8,125,902 B2
(45) Date of Patent: Feb. 28, 2012

(54) METHOD AND SYSTEM FOR CONGESTION AVOIDANCE IN PACKET SWITCHING DEVICES

(75) Inventors: Steve Rochon, Brossard (CA); Richard S. Norman, Sutton (CA); Robin Boivin, Ste-Anne-de-Bellevue (CA)

(73) Assignee: Hyperchip Inc., Sutton, Quebec (CA)

( * ) Notice: Subject to any disclaimer, the term of this patent is extended or adjusted under 35 U.S.C. 154(b) by 3457 days.

(21) Appl. No.: 09/963,487

(22) Filed: Sep. 27, 2001

(65) Prior Publication Data
US 2003/0058793 A1 Mar. 27, 2003

(51) Int. Cl.
*G01R 31/08* (2006.01)
(52) U.S. Cl. ............... 370/230.1; 370/231; 370/233; 370/234; 370/235.1; 370/236.1; 370/236.2; 709/223; 709/224; 709/225; 709/226
(58) Field of Classification Search ............ 370/229, 370/230, 230.1, 231, 232, 233, 234, 235, 370/235.1, 236, 236.1, 236.2; 709/223–226
See application file for complete search history.

(56) References Cited

U.S. PATENT DOCUMENTS

| | | | |
|---|---|---|---|
| 5,115,429 A | 5/1992 | Hluchyj et al. | |
| 5,313,454 A | 5/1994 | Bustini et al. | |
| 5,359,593 A * | 10/1994 | Derby et al. ............. | 370/234 |
| 5,426,640 A | 6/1995 | Hluchyj et al. | |
| 5,436,891 A | 7/1995 | Grossman et al. | |
| 5,497,375 A | 3/1996 | Hluchyj et al. | |
| 5,629,927 A | 5/1997 | Waclawsky et al. | |
| 5,787,071 A | 7/1998 | Basso et al. | |
| 5,790,522 A | 8/1998 | Fichou et al. | |
| 5,815,492 A | 9/1998 | Berthaud et al. | |
| 5,898,691 A | 4/1999 | Liu | |
| 5,912,894 A | 6/1999 | Duault et al. | |
| 6,011,776 A | 1/2000 | Berthaud et al. | |
| 6,091,708 A | 7/2000 | Matsunuma | |
| 6,108,304 A | 8/2000 | Abe et al. | |
| 6,118,791 A | 9/2000 | Fichou et al. | |
| 6,252,848 B1 | 6/2001 | Skirmont | |

(Continued)

FOREIGN PATENT DOCUMENTS

CA 2292828 * 12/1999

(Continued)

OTHER PUBLICATIONS

International Search Report PCT/CA02/01451, Apr. 9, 2003.

(Continued)

*Primary Examiner* — Christopher Grey

(57) ABSTRACT

A method, apparatus and computer-readable storage medium for regulating packet flow through a device such as a router with a switch fabric. Congestion information, such as statistics on bandwidth utilization, is collected for each of a plurality of queues at an egress stage of the device. Based on the bandwidth utilization statistics, computations are performed to evaluate a "discard probability" for each queue. This information is transmitted to the ingress stage, either periodically or at other controlled time periods, such as when the discard probability changes significantly. The ingress stage can then proceed with controllable transmission or non-transmission of packets to the switch fabric, depending on the queue for which the packet is destined and also depending on the discard probability for that queue. In this way, congestion can be avoided even before it even has a chance to occur. This leads to improved bandwidth utilization, since packets which are discarded at the ingress stage will not unnecessarily take up other resources in the device.

56 Claims, 2 Drawing Sheets

U.S. PATENT DOCUMENTS

| | | | |
|---|---|---|---|
| 6,424,624 B1 | 7/2002 | Galand et al. | |
| 6,430,155 B1 | 8/2002 | Davie et al. | |
| 6,728,253 B1 * | 4/2004 | Jeffries et al. | 370/412 |
| 6,820,128 B1 * | 11/2004 | Firoiu et al. | 709/233 |
| 6,898,182 B1 * | 5/2005 | Cloonan | 370/232 |
| 7,002,980 B1 * | 2/2006 | Brewer et al. | 370/414 |
| 7,616,573 B2 * | 11/2009 | Olesinski et al. | 370/235 |
| 2002/0105908 A1 * | 8/2002 | Blumer et al. | 370/230 |

FOREIGN PATENT DOCUMENTS

| | | |
|---|---|---|
| CA | 2292828 | 6/2001 |
| WO | WO 01/05107 | 1/2001 |

OTHER PUBLICATIONS

BLUE: A new class of active queue management algorithms, Wu-chang Feng, Dilip D. Kandlur, Debanjan Saha and Kang G. Shin, proceedings of IEEE Int'l workshop on network and operating system support for digital audio & video Conference dates: Jun. 25, 2001 and Jun. 26, 2001.

Feng, Wu-chang et al., "BLUE: A New Class of Active Queue Management Algorithms", in : *Proceedings of IEEE Int'l Workshop on network and operating system support for digital audio & video*, Jun. 25-26, 2001, pp. 1-26.

* cited by examiner

METHOD AND SYSTEM FOR CONGESTION AVOIDANCE IN PACKET SWITCHING DEVICES

FIELD OF THE INVENTION

The present invention relates to congestion avoidance in packet switching devices and, more particularly, to congestion avoidance using packet discard techniques.

BACKGROUND OF THE INVENTION

The aggregate link bandwidth for all links supported by a packet switching device (e.g., a router) is often higher than the total switching capacity of the device. This causes congestion at buffers located at the ingress (pre-stitching) and egress (post-switching) stages of the device. Congestion may even arise in switch fabrics that are non-blocking. Commonly, buffering may be used to control congestion. However, buffering may cause delays in the delivery of packets and therefore in order to avoid excessive delays, a more sophisticated technique for congestion needs to be developed.

One solution for controlling congestion is a tail drop approach, whereby an egress buffer is allowed to fill and then packets are dropped if they arrive from the switch fabric while the buffer is full. However, this approach may cause multiple flows to suffer lost packets. The higher layer protocols may react to this type of packet loss by terminating the flow and re-transmitting the lost information. Although congestion per se has been eliminated, the end result will be a highly undesirable slowdown-speedup-slowdown-etc. behaviour of the packet switching device.

In another conventional congestion control algorithms, the egress stage takes an action on each packet, such action being either to queue the packet or discard it. An example of an algorithm of this type is a random early discard (RED) algorithm. Specific examples of RED algorithms include the RED algorithm (described in Internet Request For Comments (RFC) 2309, April 1998, incorporated by reference herein) and the BLUE algorithm (described in "BLUE: A New Class of Active Queue Management Algorithms", Wu-chang Feng et al., pages 1-26, incorporated by reference herein). The decision as to whether a packet should be discarded or queued is made by monitoring the degree to which the egress buffer on a given link is full and consequently generating a discard probability for that packet. If a random number generated for that packet is below the discard probability, the packet is discarded; otherwise it is placed in the egress buffer. In this way, congestion at the egress buffer can be controlled by actions taken at the egress buffer.

However, adding to jitter and latency by delaying packets that will not be discarded and sending packets that will be discarded requires switch fabrics to be significantly over-provisioned. Thus, by the very action of discarding or queuing a packet at the device egress (i.e., once switching resources have already been utilized to switch the packet), those packets that are eventually discarded will have unnecessarily consumed resources throughout the ingress and switching stages of the packet switching device. Clearly, by making decisions based on measured congestion levels, there will inevitably be an inefficiency regarding the extent to which the memory and/or switching resources of the devices are utilized.

Accordingly, there is a need in the industry to develop a mechanism that limits congestion while resulting in more efficient resource utilization within a packet switching device such as a router.

SUMMARY OF THE INVENTION

The present invention provides a method for regulating packet flow at the ingress stage of a packet switching device. Specifically, bandwidth utilization information is obtained for each of a plurality of queues at the egress stage of the device. Based on the bandwidth utilization information, computations are performed to evaluate a "discard probability" for each queue. This information is transmitted to the ingress stage, either periodically or at other controlled time periods, such as when the discard probability changes significantly. The ingress stage can then proceed with controllable transmission or non-transmission of packets to the switch fabric, depending on the queue for which the packet is destined and also depending on the discard probability for that queue. In this way, congestion can be avoided even before it even has a chance to occur. This leads to improved bandwidth utilization, since packets which are discarded at the ingress stage will not unnecessarily take up other resources in the device.

Accordingly, the present invention may be summarized as a method of regulating packet flow through a device having a switch fabric with a plurality of input ports and a plurality of output ports, a control entity connected to the input ports for regulating packet flow thereto, and a plurality of egress queues connected to the output ports for temporarily storing packets received therefrom. The method includes obtaining bandwidth utilization information regarding packets received at the egress queues; determining, from the bandwidth utilization information, a discard probability associated with each egress queue; and providing the discard probability associated with each egress queue to the control entity, for use by the control entity in selectively transmitting packets to the input ports of the switch fabric.

In a specific embodiment, obtaining bandwidth utilization information regarding packets received at the egress queues may include determining, for each particular one of the output ports, an average idle time between successive packets received from the particular output port; determining for each particular one of the output ports, an average number of traffic bytes received per time unit for each egress queue connected to the particular output port and determining, for each particular one of the output ports, an average number of non-traffic bytes received per time unit from the particular output port.

In a specific embodiment, a discard probability for a particular one of the egress queues may then be determined by determining an allocated traffic bandwidth for the particular egress queue and comparing the average number of received traffic bytes for the particular egress queue to the allocated traffic bandwidth for the particular egress queue. If the average number of received traffic bytes for the particular egress queue is greater (less) than the allocated traffic bandwidth for the particular egress queue, the discard probability for the particular egress queue is set to the sum of a time average of previous values of the discard probability for the particular egress queue and a positive (negative) increment.

In a specific embodiment, a discard probability could be computed for each combination of egress queue and packet priority.

In a specific embodiment, the method of the invention may be embodied as a sequence of instructions on a computer-readable storage medium.

The method may be summarized according to a second broad aspect as a drop probability evaluation module, which includes an allocation processing entity, for determining an allocated traffic bandwidth for each of the egress queues and a probability processing entity in communication with the allocation processing entity, the probability processing entity being adapted to receive the allocated traffic bandwidth for each of the egress queues from the allocation processing entity and also adapted to receive an average number of received traffic bytes for each of the egress queues from an external entity.

The probability processing entity is operable to compare the average number of received traffic bytes for each particular one of the egress queues to the allocated traffic bandwidth for the particular egress queue and set the discard probability for the particular egress queue to the sum of a time average of previous values of the discard probability for the particular egress queue and either a positive or a negative increment, depending on whether the average number of received traffic bytes for the particular egress queue is greater or less than the allocated traffic bandwidth for the particular egress queue.

According to a third broad aspect, the present invention may be summarized as a device equipped with a switch fabric having a plurality of input ports and a plurality of output ports, the switch fabric being adapted to switch packets between its input ports and its output ports. The device also includes a plurality of egress queues connected to corresponding ogles of the output ports of the switch fabric, each egress queue being adapted to (i) temporarily store packets received from the corresponding output port of the switch fabric and (ii) determine bandwidth utilization information on the basis of the packets received at the egress queues.

The device further includes a drop probability evaluation module connected to the egress queues, the drop probability evaluation entity being adapted to determine a discard probability associated with coach of the egress queues on the basis of the bandwidth utilization information. The device also includes a packet acceptance unit connected to the input ports of the switch fabric and to the drop probability evaluation module, the packet acceptance entity being adapted to (i) receive packets destined for the output ports of the switch fabric; (ii) identify an egress queue associated with each received packet; and (iii) on the basis of the discard probability associated with the egress queue associated with each received packet, either transmit or not transmit the received packet to one of the input ports of the switch fabric.

According to still another broad aspect, the present invention may be summarized as a method of regulating packet flow through a device having an ingress entity, an egress entity, a processing fabric between the ingress entity and the egress entity, and a control entity adapted to process packets prior to transmission thereof to the ingress entity. The method includes obtaining congestion information regarding packets received at the egress entity and providing the congestion information to the control entity, for use by the control entity in processing packets prior to transmission thereof to the ingress entity.

These and other aspects and features of the present invention will now become apparent to those of ordinary skill in the art upon review of the following description of specific embodiments of the invention in conjunction with the accompanying drawings.

DETAILED DESCRIPTION OF THE PREFERRED EMBODIMENTS

Figure 1:
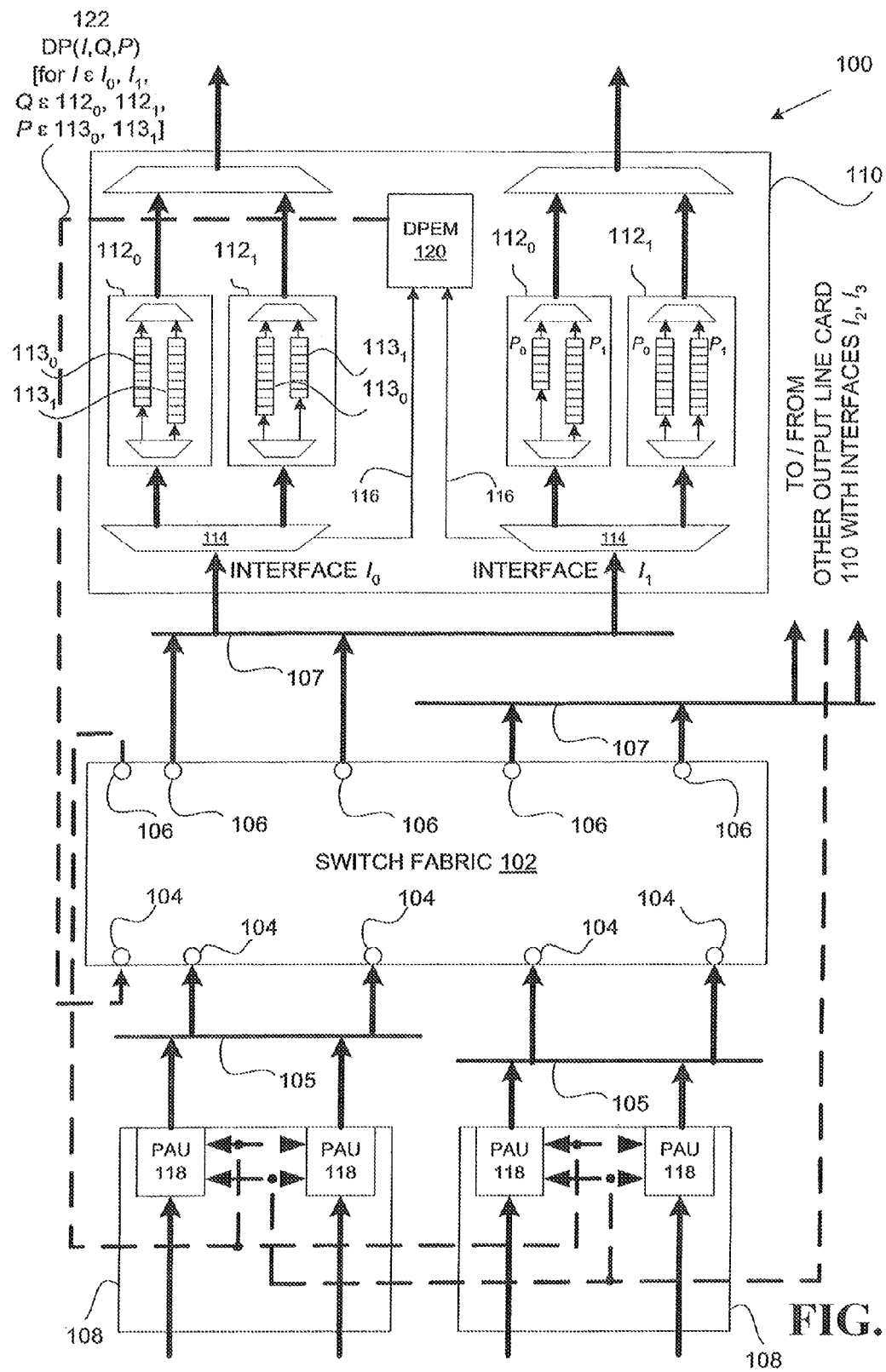
FIG. 1 is a block diagram of a packet switching device equipped with random packet discard functionality in accordance with an embodiment of the present invention.

With reference to FIG. 1, there is shown a packet switching device in accordance with art embodiment of the present invention, which implements congestion avoidance by either transmitting or not transmitting packets at an ingress stage, based on congestion information obtained at an egress stage.

In one embodiment, the packet switching device 100 is a multi-stage router and the egress stage may be an intermediate or final stage in the multi-stage router. The device 100, which can be connected to adjacent devices (e.g., routers or nodes) in a packet switched network, includes a switch fabric 102 with a plurality of input ports 104 and a plurality of output ports 106. The input ports 104 of the switch fabric 102 are connected to a set of input line cards 108 and the output ports 106 of the switch fabric 102 are connected to a set of output line cards 110. In embodiments where the line cards are bi-directional, it is possible that there will be no distinction between the input and output line cards 108, 110. Also, in a multi-stage router, the output line cards 110 would be embodied as a next stage of routing.

The input line cards 108 are adapted to receive streams of packets from an external entity and provide them to the input ports 104 of the switch fabric 102. Each input line card 108 may be connected to one, two or more input ports 104 of the switch fabric 102 via a bus architecture 105. The output line cards 110 are adapted to receive streams of packets from the output ports 106 of the switch fabric 102 and to forward them further downstream to an adjacent router or node of the network. Each output line card 110 has one, two or more physical interfaces, which correspond to individual ones of the output ports 106 of the switch fabric 102. The interfaces on each individual output line card 110 are connected to the corresponding output ports 106 of the switch fabric 102 via a bus architecture 107 common to that output line card 110. In the illustrated embodiment, there are four interfaces denoted $I_0$, $I_1$, $I_2$, $I_3$, with two interfaces being located on each of two output line cards 110. However, it should be understood that other arrangements are possible and that the present invention is not limited to any particular number of interfaces, output line cards 110 or distribution of interfaces amongst the output line cards 110.

A packet is typically formed by a header and a payload, and may be associated with a priority (or precedence or service class). The header usually identifies the priority of the packet (if applicable) as well as a destination node for which the packet is destined. The input line card 108 that receives a particular packet translates its destination node into a destination output port, say $106_x$, of the switch fabric 102 and inserts the identity of this destination output port $106_x$ into the header of the packet. The packet, with the identity of destination output port $106_x$ now specified in the header, is then provided via the appropriate bus 105 to an input port 104 of the switch fabric 102. The switch fabric 102 is responsible for ensuring that the packet indeed emerges at the desired destination output port $106_x$. The output line card 110 that has an interface connected to destination output port $106_x$ (via the appropriate bus 107 for that output line card) removes the identity of the destination output port $106_x$ from the header of the packet and forwards the packet, in its original form, to an adjacent router or node of the network. In this way, the packet is moved closer to its destination node. In the case of a multi-stage router, the output line card would represent a next stage of routing.

In one embodiment, the switch fabric 102 is capable of supplying information to each output line card 110 at a higher rate than the one at which the output line card 110 can transmit out of the device 100. This is in order to allow the output line card 110 to buffer the excess bandwidth and make intelligent decisions about how to route the buffered packets. In other embodiments, the egress entity need not be a queue, strictly speaking, if the rate of departure of packets from the device 100 matches or is less than the rate that (an be handled by an external device connected to the output line cards 110.

Regardless of whether a buffering capability is required at the egress of the device 100, the interfaces on the output line cards 110 contain an egress entity. In one embodiment, each interface on each of the output line cards 110 is associated with an one, two or more egress queues 112 forming part of the egress entity. The egress queues are used to temporarily store packets in the stream of packets arriving from the corresponding output port 106 of the switch fabric 102 via the appropriate bus 107. The egress queues 112 can be said to behave as virtual interfaces or virtual ports for the physical interface with which they are associated. It should be mentioned that in a multi-stage router, the egress queues 112 may in fact be ingress queues with respect to a subsequent stage of routing.

In the illustrated embodiment, there are two egress queues 112 per interface and are individually denoted $Q_0$, $Q_1$. Thus, interface $I_0$ is associated with its own egress queues $Q_0$, $Q_1$, interface $I_1$ is associated with its own egress queues $Q_0$, $Q_1$, etc. However, it should be understood that other arrangements are possible and that the present invention is not limited to any particular number of egress queues 112 per interface. Moreover, in the case where packets can have different priorities (e.g., $P_0$ and $P_1$), the egress queues 112 may each be divided into a respective set of sub-queues 113 on the basis of priority. It should be appreciated that the sub-queues 113 need not all be of the same depth, and there need not be the same number of sub-queues 113 for each egress queue 112.

According to an embodiment of the present invention, there is also provided an egress traffic manager (ETM) 114 for each interface. Each egress traffic manager 114 comprises suitable circuitry, software and/or control logic for removing the identity of the destination output from the header of each received packet and also for determining to which interface and into which egress queue 112 and sub-queue 113 the received packet is to be placed. It should be appreciated that in other embodiments of the present invention, there may be provided one egress traffic manager 114 per output line card 110, such that each egress traffic manager 114 would be connected directly in the path of a corresponding one of the buses 107.

The determination of the interface to which to transmit a received packet may be made on the basis of information (such as the destination node) specified in the received packet's header. The determination of the egress queue 112 into which to insert a received packet may be made on the basis of information (such as a virtual port identifier) specified in the received packet's header. The determination of the sub-queue 113 into which to insert a received packet may be made on the basis of information (such as the priority) specified in the received packet's header.

Assuming for the purposes of illustration that there is in fact one egress traffic manager 114 per interface, each such egress traffic manager 114 is additionally equipped with circuitry, software and/or control logic for monitoring the number and destination of packets received from the corresponding output port 106 of the switch fabric 102. On the basis of this information, the egress traffic manager 114 generates information indicative of congestion.

The congestion information may include bandwidth utilization information, such as:
  an average idle time between received packets at interface $I_i$ (denoted $AIT(I_i)$—Average Idle Time);
  an average received non-traffic bytes value for interface $I_i$ (denoted $ARNB(I_i)$—Average Received Non-traffic Bytes); and
  an average received traffic bytes value for each priority $P \in \{113_0, 113_1\}$ of each egress queue $Q \in \{112_0, 112_1\}$ associated with interface $I_i$ (denoted $ARTB(I_i, Q, P)$—Average Received Traffic Bytes).

The congestion information may alternatively include a measure of the depth of each egress queue 112 or a measure of the variability of each queue. Assuming for the purposes of illustration that the congestion information is bandwidth utilization information produced by each egress traffic manager 114 located on a given output line card 110, such information is provided to a common discard probability evaluation nodule (DPEM) 120 for that output line card 110. (Alternatively, there may be a separate DPEM 120 for each egress, traffic manager 114 on the output line card 110.)

The DPEM 120 on a given output line card 110 comprises circuitry, software and/or control logic for computing a discard probability for each egress queue 112 and sub-queue 113 associated with each interface on that given output line card 110. Thus, each DPEM 120 will be responsible for computing the discard probabilities for one, two or more interfaces, depending on the number of interfaces on the output line card where the DPEM 120 is located. For notational convenience, the discard probability for interface $I_i$, queue $112_q$ and sub-queue $113_p$ shall be denoted $DP(I_i, 112_q, 113_p)$.

Each DPEM 120 is connected via a control link 122 to one or more packet acceptance units (PAUs) 118 in each input line card 108. The control link from a given DPEM 120 to the input line cards 108 carries the discard probability $DP(I,Q,P)$ for each combination of queue and priority that are possible for each interface associated with the output line card 110 containing the DPEM 120. Since this is done by each DPEM 120 in each output line card 110, each PAU 118 in each input line card 108 will therefore have access to the discard probability for every possible combination of interface, queue and sub-queue. The discard probabilities transmitted by a particular DPEM 120 may be sent in the form of a broadcast message. The switch fabric 102 may in fact be used as a channel for carrying the discard probabilities $DP(I,Q,P)$ from each DPEM 120 to the PAUs 118.

Considering the PAU 118 in a given one of the input line cards 108, this unit is employed for processing a stream of packets prior to the packets' transmission to a corresponding input port 104 of the switch fabric 102. One of the functions of the PAU 118 is to implement congestion avoidance functionality using random discard of packets, based upon the interface and egress queue (and priority, if applicable) of each packet and based upon the discard probability associated with that combination of interface, egress queue (and priority, if applicable). Although the illustrated embodiment shows one PAU 118 per input port 104 of the switch fabric 102, in some embodiments it may be advantageous to provide one PAU 118 per input line card 108 or a single PAU 118 that is distributed amongst the input line chords 108.

The PAU 118 assigned to process a particular stream of packets is equipped with suitable circuitry, software and/or control logic for determining the destination output part of each received packet. This destination output port will correspond to one of the interfaces (say, $I_i$) on one of the output line cards 110. In addition, the PAU 118 comprises suitable circuitry, software and/or control logic for determining one of the egress queues 112 (say, $112_q$) into which the received packet will be inserted by the egress traffic manager 114 associated with the interface corresponding to the destination output port. Moreover, if a received packet can have either of several priorities, then the PAU 118 further includes suitable circuitry, software and/or control logic for determining the priority associated with the packet and hence the sub-queue (say, $113_p$) into which the packet is to be inserted. Based on this information and also based on the discard probability $DP(I_i, 112_q, 113_p)$, the PAU 118 makes a decision as to whether it should drop the received packet or continue with its transmission towards the switch fabric 102.

In order to make its decision as to whether or not to drop a received packet characterized by interface $I_i$, egress queue $112_q$ and sub-queue $113_p$, the PAU 118 includes suitable circuitry, software and/or control logic for generating a random number R for the received packet and for comparing R to the discard probability $DP(I_i, 112_q, 113_p)$. If R is, say, lower than $DP(I_i, 112_q, 113_p)$, then the packet is discarded, otherwise the packet is sent into the corresponding input port 104 of the switch fabric 102. Alternatively, the packet can be discarded if the random number R is higher than discard probability $DP(I_i, 112_q, 113_p)$ The term "random number" in this sense is meant to include a number generated by pseudo-random or quasi-random techniques.

In the case where it is decided that a received packet is indeed to be forwarded to the switch fabric 102, the PAU 118 comprises suitable circuitry, software and/or control logic for inserting the identity of the destination output port into the header of the packet and to forward the packet, whose header now specifies the identity of the destination output port, to the Corresponding input port 104 of the switch fabric 102. However, in the case where it is decided that the received packet is to be discarded, the packet is not transmitted to the switch fabric 102 and may be discarded from memory altogether or sent to a separate memory store for discarded packets. Advantageously, packets that are not transmitted do not consume resources in the switch fabric 102 or in the congestion management facility of the PAU 118, leading to improved resource utilization.

Generation of the bandwidth utilization values (i.e., AIT $(I_0)$, $ARBN(I_0)$, and $ARBT(I_0, Q, P)$) by the egress traffic manager 114 associated with interface $I_0$ is now described. Firstly, with respect to the $AIT(I_0)$ value, this is an indication of overall bandwidth utilization of interface $I_0$. If fixed-length packets are used, then overall bandwidth utilization could be measured directly by counting the number of packet arrivals per second at the egress traffic manager 114. In such a case, computation of the average idle time is not necessary. However, if variable-length packets are used, overall bandwidth utilization is preferably measured indirectly, e.g., by evaluating the average duration of the interval of non-transmission between successive received packets. This is referred to as the average idle time between packets.

Implementation of an approach whereby the average idle time between packets is measured is facilitated if a dedicated bit in a word is used to indicate whether that word is a certain number of words away from the last word in the packet to which that word belongs. Such a technique for signaling the imminent end of a packet is described in U.S. patent application Ser. No. 09/870,766 to Norman et al., filed on May 31, 2001, assigned to the assignee of the present invention and hereby incorporated by reference herein.

The egress traffic manager 114 associated with interface $I_0$ also generates the $ARTB(I_0, Q, P)$ values for $Q \in \{112_0, 112_1\}$, $P \in \{113_0, 113_1\}$, which is indicative of the average number of traffic bytes destined for each combination of egress queue and sub-queue for interface $I_0$. A traffic byte is a byte belonging to a packet that must meet certain user-oriented quality of service criteria. In other words, traffic bytes belong to packets for which congestion avoidance is to be performed. In order to compute each $ARTB(I_0, Q, P)$ value, the egress traffic manager 114 comprises suitable circuitry, software and/or control logic for analyzing the header of each incoming packet and, from the information in the header, determining the egress queue 112 for which the packet is destined, as well as the priority of the packet.

Additionally, the egress traffic manager 114 associated with interface $I_0$ also generates the $ARNB(I_0)$ value for, which is indicative of the average number of non-traffic bytes received at interface $I_0$. A non-traffic byte belongs to a packet to which user-oriented quality of service criteria are not attached. In order to compute the $ARNB(I_0)$ value, the egress traffic manager 114 comprises suitable circuitry, software and/or control logic for analyzing the header of each incoming packet and, from the information in the header, determining whether the packet is a traffic packet or a non-traffic packet. It should be understood that the analysis of each packet's header may be done only once for each packet, in the context of computing tooth the ARNB $(I_0)$ value and the $ARTB(I_0, Q, P)$ value.

Figure 2:
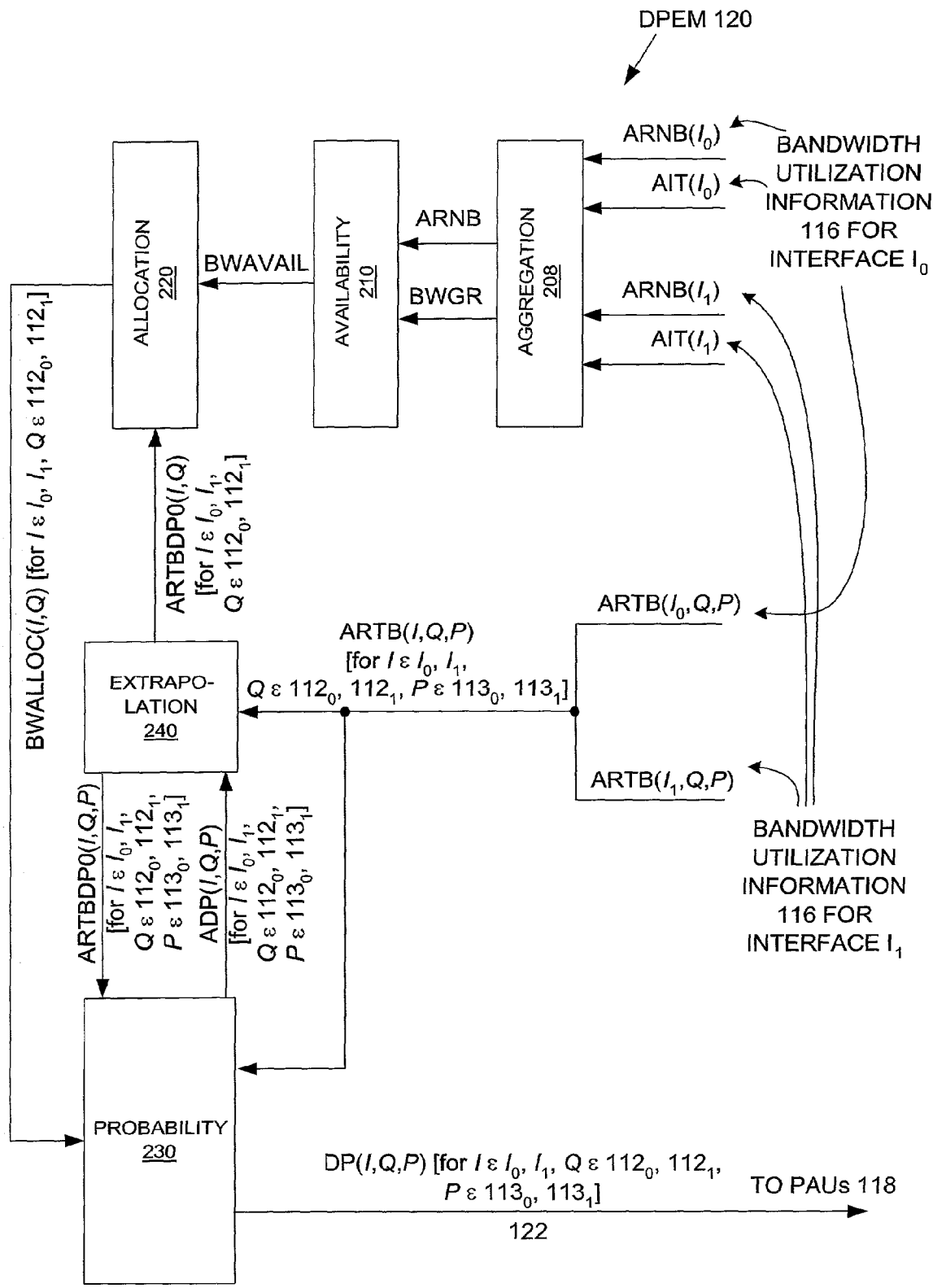
FIG. 2 is a block diagram of an embodiment of a discard probability evaluation module in the device of FIG. 1.

An example of a discard probability evaluation module (DPEM) 120 suitable for computation of the discard probability $DP(I_i, 112_q, 113_p)$ for each valid combination of i, q and p is now described in greater detail with reference to FIG. 2. Specifically, the illustrated DPEM 120, which is associated with one of the output line cards 110, includes an aggregation processing entity 208, an availability processing entity 210, an allocation processing entity 220, a probability processing entity 230 and an extrapolation processing entity 240.

The aggregation processing entity 208 receives the ARNB $(I_0)$ value and the $AIT(I_0)$ value from the egress traffic manager 114 associated with interface $I_0$, and the $ARNB(I_1)$ value and the $AIT(I_0)$ value from the egress traffic manager 114 associated with interface $I_1$. Based on its inputs, the aggregation processing entity 208 determines an aggregate average number of received non-traffic bytes (denoted ARNB), as well as a bandwidth gradient (denoted BWGR) The ARNB and BWGR values are provided to the availability processing entity 210. Computation of the ARNB value can be done by adding the ARNB(I) values are added for i=0 and i=1. Computation of the BWGR value can be done as follows:

The measured average idle time $AIT(I_0)$, $AIT(I_1)$ for each interface is averaged, in order to come up with an aggregate average idle time. The aggregate average idle time is then compared to a set of pre-determined thresholds. In one embodiment, the aggregate average idle time for each interface is first compared to a critical minimum average threshold (denoted $T_1$). If it is less than $T_1$, then this situation is indicative of a critical over-utilization of bandwidth within the switch fabric 102. The bandwidth gradient value (BWGR) is consequently set to indicate that an urgent bandwidth decrement is required at the ingress side.

If, however, the aggregate average idle time is not less than $T_1$, then it is compared to a pre-determined minimum average threshold (denoted $T_2$). If the aggregate average idle time is less than $T_2$, then this situation is indicative of non-critical congestion that consumes buffer space within the switch fabric 102. The bandwidth gradient value (BWGR) is consequently set to indicate that a moderate bandwidth decrement is required at the ingress side.

If the aggregate average idle time is not less than $T_2$, then it is compared to a pre-determined maximum average threshold (denoted $T_3$). If the aggregate average idle time is greater than $T_3$, then this situation is indicative of an under-utilization of bandwidth within the switch fabric 102. The bandwidth gradient value (BWGR) is consequently set to indicate that a bandwidth increment is required at the ingress side.

Finally, if the aggregate average idle time is between $T_2$ and $T_3$, then this situation is indicative of a utilization of bandwidth within the switch fabric 102 which does not require compensation. The bandwidth gradient value (BWGR) is consequently set to indicate that neither a bandwidth increment nor a bandwidth decrement is required at the ingress side.

It should be noted that the thresholds $T_1$, $T_2$ and $T_3$ can be adjusted dynamically based on parameters such as bandwidth utilization and possibly, in addition, queue depth and bandwidth variability (burstiness).

The availability processing entity 220 receives the BWGR value (i.e., the bandwidth gradient) and the ARNB value (i.e., the average received non-traffic bytes) from the aggregation processing entity 208. Based on its inputs, the availability processing entity 210 determines a total available bandwidth for traffic packets, which is supplied to the allocation processing entity 220 in the form of a BWAVAIL (BandWidth AVAILable) value. Computation of the BWAV value can be done as follows:

The availability processing entity keeps an internal record of the aggregate bandwidth available to all packets (both traffic packets and non-traffic packets), which may be denoted AGG_AVAIL. If the BWGR value is indicative of a bandwidth increment being required at the ingress side, then AGG_AVAIL is incremented by a pre-configured step value, up to a maximum aggregate available bandwidth; if the BWGR value is indicative of a bandwidth decrement being required at the ingress side, then AGG_AVAIL is decremented by a pre-configured step value, down to a minimum aggregate available bandwidth; if the BWGR value is indicative of neither a bandwidth increment nor a bandwidth decrement being required at the ingress side, then AGG_AVAIL remains unchanged; and if the BWGR value is indicative of an urgent bandwidth decrement being required at the ingress side, then AGG_AVAIL is set to a pre-configured (low) value.

Next, the ARNB value is subtracted from the resultant value for AGG_AVAIL, yielding the BWAVAIL value, which is the total bandwidth available only for traffic packets. In one embodiment of the present intention, the step values for the increment and decrement operations may each be percentages of the minimum aggregate available bandwidth. Since it may be more important to decrement bandwidth than to increment it, the step value for the increment operation may be lower than the step value for the decrement operation.

The allocation processing entity 220, in addition to receiving the total available bandwidth for traffic packets from the availability processing entity 210 in the form of the BWAVAIL value, also receives an indication of the average number of bytes that would be received for each egress queue 112 on the output line card if the discard probability were zero. This information is received from the extrapolation processing entity 240 in the form of a plurality of ARTBDP0(I,Q) values (i.e., Average Received Traffic Bytes if the Discard Probability were 0), where $I \in \{I_0, I_1\}$ and $Q \in \{112_0, 112_1\}$. Computation of each ARTBDP0(I,Q) value is described in greater detail later on in the context of the extrapolation processing entity 240.

Based on its inputs, the allocation processing entity 220 allocates bandwidth for traffic bytes for each valid combination of I and Q. The outcome of this computation is provided to the probability processing entity 230 in the form of an allocated bandwidth value (denoted BWALLOC(I,Q)—BandWidth ALLOCated) for that combination of I and Q.

Computation of the BWALLOC(I,Q) value can be done as follows: The allocation processing (entity 220 first determines whether the bandwidth commitments for each combination of I and Q are being met. This is done by comparing the previous value of BWALLOC(I,Q) to the corresponding ARTBDP0(I,Q) value. Thus, the allocated bandwidth is being compared to the maximum possible bandwidth that could be received for that combination of I and Q.

If BWALLOC(I,Q) exceeds ARTBDP0(I,Q), then BWALLOC(I,Q) is decreased, e.g., by a fixed amount or by a factor that depends on the difference between BWALLOC(I,Q) and ARTBDP0(I,Q). On the other hand, if BWALLOC(I,Q) is less than ARTBDP0(Z,Q), then BWALLOC(I,Q) is increased, e.g., by a fixed amount or by a factor that depends on the difference between ATBDP0(I,Q) and BWALLOC(I,Q). The incremented or decremented values of BWALLOC(I,Q) are supplied to the probability processing entity 230.

It should be noted that alternative embodiments, in which an outcome of "no change" could be applied to a particular BWALLOC(I,Q) values, are also within the scope of the present invention. It should further be noted that it is advantageous to perform a check in order to ensure that the sum of BWALLOC(I,Q) over all I and Q for the same line card does not exceed BWAVAIL for that line card, as received from the availability processing entity 210.

The probability processing entity 230, in addition to receiving the BWALLOC(I,Q) values (for $I \in \{I_0, I_1\}$ and $Q \in \{112_0, 112_1\}$) from the allocation processing entity 220, also receives the ARTBDP0(I,Q,P) values (for $I \in \{I_0, I_1\}$, $Q \in \{112_0, 112_1\}$ and $P \in \{113_0, 113_1\}$) from the extrapolation processing entity 240, the ARTB $(I_0,Q,P)$ values (for $Q \in \{112_0, 112_1\}$ and $P \in \{113_0, 113_1\}$) from the egress traffic manager 114 associated with interface $I_0$ and the ARTB($I_1$,Q,P) values (for $Q \in \{112_0, 112_1\}$ and $P \in \{113_0, 113_1\}$) from the egress traffic manager 114 associated with interface $I_1$.

Based on its inputs, the probability processing entity 230 generates the discard probability DP(I,Q,P) for each valid combination of I, Q and P, in this case for $I \in \{I_0, I_1\}$, $Q \in \{112_0, 112_1\}$ and $P \in \{113_0, 113_1\}$. Computation of the discard probability DP(I,Q,P) for all values of P for a given value of I (say, i) and Q (say, q) can be done as follows:

Firstly, the sum of the ARTB(i,q,P) is taken over all P. This leads to a quantity that represents the total average number of received traffic bytes for egress queue $112_q$ associated with interface $I_i$, which may be denoted TARTB(i,q). This quantity is compared to BWALLOC(i,q), in order to determine whether more bandwidth than is required has been allocated. Since optimal resource usage efficiency occurs when the allocated bandwidth matches the actual bandwidth used, the difference in the two quantities provides an error signal that is to be driven to zero. At this stage, it is possible to take a simple approach and a more complex approach. The simple approach will be described first, followed by the more complex approach.

In the event that the allocated bandwidth is greater than the total average bandwidth used, the discard probability DP(i,q,P) will, in the simple approach, be decreased for one or more P (depending on whether an intserv or diffserv model is applied) so that fewer packets are discarded at the ingress, resulting in an eventual increase in TARTB(i,q). Conversely, if the total average bandwidth is less than the actual bandwidth used, the discard probability DP(i,q,P) will be increased for one or more P (depending on whether an intserv or diffserv model is applied) so that a greater number of packets are discarded at the ingress, resulting in an eventual decrease in TARTB(i,q). The magnitude of an increase applied to the discard probability DP(i,q,P) could be different from the magnitude of a decrease.

The above procedure is repeated until the allocated bandwidth is within a certain range of the total average bandwidth used. Advantageously, this provides a certain level of congestion avoidance. However, convergence may take a relatively long time to occur. This is due to the fact that a large amount of time will elapse between a change in the discard probability and a corresponding change in the average number of received traffic bytes. Moreover, if the discard probability is altered before a change in the average number of received traffic bytes can be detected, then it is possible to "overshoot" the final discard probability that would allow the allocated bandwidth to be within a certain range of the total average bandwidth used. In order to reduce the convergence time, one may have recourse to a more complex approach.

In the more complex approach, the net amount by which the discard probability for each P is increased/decreased is the result of an iterative procedure which relies on (i) a time average of the discard probability (denoted ADP(i,q,P) and is provided to the extrapolation processing entity 240); (ii) a temporary discard probability (denoted $DP_{temp}$ (i,q,P); and (iii) a temporary average number of received traffic bytes (denoted $ARTB_{temp}$ (i,q,P)).

At initialization, the temporary drop probability $DP_{temp}$(i, q,P) is set to the previous version of DP(i,q,P) and the temporary average number of received traffic bytes $ARTB_{temp}$(i, q,P)) is set to the previous average number of received traffic bytes ARTB (i,q,P)). The iterative procedure starts by determining whether an increase or decrease in the drop probability is required by comparing, as before, the allocated bandwidth BWALLOC(i,q) and the total average bandwidth used TARTB (i,q). Depending on whether an increase or decrease is required, the value of the temporary drop probability for one or more P is changed accordingly.

At this point, the temporary average number of received traffic bytes $ARTB_{temp}$(i,q,P) is altered, but in the opposite direction. Thus, an increase in the temporary drop probability corresponds to a decrease in the temporary average number of received bytes, while a decrease in the temporary drop probability corresponds to an increase in the temporary average number of received bytes. With the new value for each temporary average number of received traffic bytes, the total temporary average bandwidth used $TARTB_{temp}$(i,q) is computed by summing together the values of $ARTB_{temp}$(i,q,P) for all P. The value of $TARTB_{temp}$(i,q) is compared to BWALLOC(i,q) and the result will be indicative of whether the allocated bandwidth is greater than the expected total average bandwidth used.

The steps of changing the temporary drop probability $DP_{temp}$(i,q,P) for one or more P and re-evaluating the values of $ARTB_{temp}$(i,q,P) for all P and the value of $TARTB_{temp}$(i,q) can be repeated many times. In one embodiment, the steps are repeated until the value of $TARTB_{temp}$(i,q) is to within a desired range of BWALLOC(i,q). Alternatively, the steps may be repeated a fixed number of times or until convergence of the temporary drop probability is reached. In any event, after the required amount of iterations, each drop probability DP(i,q,P) is set to the current value of the corresponding temporary drop probability $DP_{temp}$(i,q,P) and is provided to the PAUs 118 in the input line cards. In this way, it is possible to predict the changes in bandwidth utilization resulting from a change in discard probability in order to arrive at the desired bandwidth utilization more quickly.

Different initial step sizes may be used for the $DP_{temp}$(i,q, P) and $ARTB_{temp}$(i,q,P) values. For the $DP_{temp}$(i,q,P) values, the initial step size may be a fixed value. For the $ARTB_{temp}$(i,q,P) values, the initial step size may be a value that depends on the, which is then recued by powers of two at each (or every $N^{th}$) iteration Also, it is advantageous at each (or every $N^{th}$) iteration to reduce the step size for increasing or decreasing the $DP_{temp}$(i,q,P) values and the $ARTB_{temp}$(is q,P) values with respect to their previous values. By way of a non-limiting example, the reduction may be logarithmic (e.g., by a power of two).

It should be appreciated that those skilled in the art may be motivated to improve the performance of the probability processing entity 230 by evaluating the discard probabilities not only as a function of bandwidth utilization, but also as a function of other parameters, such as the depth of the egress queues 112 and/or sub-queues and the bandwidth variability (burstiness) of the individual streams flowing to each interface, egress queue and/or sub-queue. The burstiness of a stream can be viewed as the derivative of the bandwidth of that stream.

The extrapolation processing entity 240, in addition to receiving the ADP(I,Q,P) values from the probability processing entity 230, also receives the ARTB(I,Q,P) values, i.e., the average received traffic bytes for each valid combination of I, Q and P, from the egress traffic manager 114. Based on its inputs, the extrapolation processing entity 240 computes the average number of received traffic bytes if the discard probability were zero, for each valid combination of I, Q and P. These values are supplied to the probability processing entity 230 in the form of the ARTBDP0(I,Q,P) values.

Computation of the ARTBDP0(I,Q,P) values can be done as follows: Given the average number of received traffic bytes for each valid combination of I, Q and P, and given the average discard probability for the same combination of I, Q and P, an extrapolation can be performed to calculate what the average number of received traffic bytes would be if the discard probability were zero. Specifically, ARTBDP0(I,Q,P)=ARTB(I, Q,P)/(1−ADF(I,Q,P)). If the ARTB(I,Q,P) values are received more often than the ADP(I,Q,P) values, then upon receipt of an ARTB(I,Q,P) value, one would read the corresponding ADP(I,Q,P) value and compute the corresponding ARTBDP0(I,Q,P) value.

Additionally, the extrapolation processing entity 240 also performs a summation of the ARTBDP0(I,Q,P) values over all priorities associated with a common interface and egress queue, which yields the average number of received bytes for a given combination of I and Q worst-case received bytes for that combination of I and Q. The extrapolation processing entity 240 supplies this information to the allocation processing entity 220 in the form of the ARTBDP0(I,Q) value for that combination of I and Q. Thus, ARTBDP0(I,Q)=Σ(ARTBDP0 (I,Q,P))$_p$, where Σ(x)$_p$ denotes summation of the set of x(P) over all P.

In some embodiments, it may be advantageous to limit the rate at which the DP(I,Q,P) values are transmitted to the PAUs 118 in order to limit the flow of non-traffic bytes through the switch fabric 102 and also to limit instabilities due to long reaction Times following a change in the discard probabilities. Instead of refreshing at a high rate, a new discard probability for a given (I,Q,P) triplet may be sent whenever it has changed from its previous value by more than a pre-determined absolute or relative amount. This pre-determined amount may be programmable. It may also be different from one output port to the next, or from one egress queue 112 to the next for the same interface I or from one sub-queue 113 to the next for the same combination of interface I and egress queue Q. In other embodiments, all the discard probabilities for the same (I,Q) combination can be sent as soon as one of them changes beyond a pre-determined absolute or relative amount. A timer may also be provided in case there is no substantial difference in the discard probability, so that the value is sent to the PAUs 118 at least as often as a pre-determined number of times per second.

Moreover, according to one embodiment of the present invention, a discard probability is independently generated for each combination of output port, egress queue associated with that output port and priority. In other embodiments, the priority of a packet does not figure into the decision as to whether a packet is discarded or forwarded and hence a single discard probability would be associated with each valid combination of output port and egress queue.

Furthermore, it has been previously mentioned that, in the case where it is decided that the received packet is not to be transmitted, the packet may be discarded from memory altogether or sent to a separate memory store for discarded packets. In other embodiments, packets that are not to be transmitted into the processing fabric can be rerouted along an alternate path.

In still other embodiments, the packets to be discarded may be "marked" as "discardable" but not necessarily discarded unless and until the space they occupy in memory is needed. In this way, if the congestion which led to a packet being "marked" subsides, the packet can be unmarked and may continue on its way to the switch fabric. The characterization of a packet as "marked" may be specified in the packet's header, for example. In yet other embodiments, marked packets may nevertheless be transmitted through the switch fabric but the marking may be used as a signal to the higher layer application that a particular flow must be reduced promptly.

It should also be apparent that although the above description has made reference to a "discard" probability, this need not mean that rackets are actually discarded according to such probability. An example is in the case where packets not transmitted to the switch fabric 102 are stored in a separate memory or logged for future reference. Thus, the term "discard probability" make be regarded as referring to the broader concept of a probability of non-transmission. The decision rendered by a PAU 118 in respect of a received packet is one of transmission or non-transmission, based on the "discard" probability associated with the egress queue for which the packet is destined.

Those skilled in the art should appreciate that in some embodiments of the invention, all or part of the functionality previously described herein with respect to the path acceptance units 118, the discard probability evaluation module 120, the availability processing entity 210, the allocation processing entity 220, the probability processing entity 230 and the extrapolation processing entity 240 may be implemented as pre-programmed hardware or firmware elements (e.g., application specific integrated circuits (ASICs), electrically erasable programmable read-only memories (EEPROMs), etc.), or other related components.

In other embodiments of the invention, all or part of the functionality previously described herein with respect to the path acceptance units 118, the discard probability evaluation module 120, the availability processing entity 210, the allocation processing entity 220, the probability processing entity 230 and the extrapolation processing entity 240 may be implemented as software consisting of a series of program instructions for execution by a digital computer, including a processing unit and a memory connected by a communication bus. Such memory includes data and the program instructions. The processing unit is adapted to process the data and the program instructions in order to implement the functional blocks described in the specification end for which the operation is depicted in the drawings.

The program instructions could be stored on a medium which is fixed, tangible and readable directly by the computer system, (e.g., removable diskette, CD-ROM, ROM, or fixed disk), or the program instructions could be stored remotely but transmittable to the computer system via a modem or other interface device (e.g., a communications adapter) connected to a network over a transmission medium. The transmission medium may be either a tangible medium (e.g., optical or analog communications lines) or a medium implemented using wireless techniques (e.g., microwave, infrared or other transmission schemes).

Those skilled in the art should further appreciate that the program instructions may be written in a number of programming languages for use wish many computer architectures or operating systems. For example, some embodiments may be implemented in a procedural programming language (e.g., "C") or an object oriented programming language (e.g., "C++" or "JAVA").

While specific embodiments of the present invention have been described and illustrated, it will be apparent to those skilled in the art that numerous modifications and variations can be made without departing from the scope of the invention as defined in the appended claims.

We claim:

1. A method of regulating packet flow through a device having a processing fabric with at least one input port and at least one output port, a control entity connected to the at least one input port for regulating packet flow thereto, and a plurality of egress queues connected to the at least one output port for temporarily storing packets received therefrom, said method comprising:
   obtaining, at a physical processing entity, bandwidth utilization information regarding packets received at the egress queues, wherein obtaining said bandwidth utilization information includes determining the amount of bandwidth consumed by packets received at each of said egress queues;
   determining, from the bandwidth utilization information and the amount of bandwidth consumed by packets received at each of said egress queues, a discard probability associated with each egress queue; and
   providing the discard probability associated with each egress queue to the control entity, for use by the control entity in selectively transmitting packets to the at least one input port of the processing fabric.

2. A method as defined in claim 1, wherein obtaining bandwidth utilization information regarding packets received at the egress queues includes receiving said bandwidth utilization from at least one traffic management entity located between the egress queues and the at least one output port.

3. A method as claimed in claim 1, wherein each packet is made up of either a plurality of traffic bytes or a plurality of non-traffic bytes, and wherein obtaining bandwidth utilization information regarding packets received at the egress queues further includes determining, for each particular one of the at least one output port, an average number of traffic bytes received per time unit for each egress queue connected to the particular output port.

4. A method as claimed in claim 3, wherein determining, from the bandwidth utilization information, a discard probability for a particular one of the egress queues includes:
  determining an allocated traffic bandwidth for the particular egress queue;
  comparing the average number of received traffic bytes for the particular egress queue to the allocated traffic bandwidth for the particular egress queue; and
  if the average number of received traffic bytes for the particular egress queue is greater than the allocated traffic bandwidth for the particular egress queue, increasing the discard probability for the particular egress queue;
  if the average number of received traffic bytes for the particular egress queue is less than the allocated traffic bandwidth for the particular egress queue, decreasing the discard probability for the particular egress queue.

5. A method as claimed in claim 3, wherein determining, from the bandwidth utilization information, a discard probability for a particular one of the egress queues includes:
  determining an allocated traffic bandwidth for the particular egress queue;
  comparing the average number of received traffic bytes for the particular egress queue to the allocated traffic bandwidth for the particular egress queue; and
  if the average number of received traffic bytes for the particular egress queue is greater than the allocated traffic bandwidth for the particular egress queue, setting the discard probability for the particular egress queue to the sum of a time average of previous values of the discard probability for the particular egress queue and a positive increment;
  if the average number of received traffic bytes for the particular egress queue is less than the allocated traffic bandwidth for the particular egress queue, setting the discard probability for the particular egress queue to the sum of said time average of previous values of the discard probability for the particular egress queue and a negative increment.

6. A method as claimed in claim 3, wherein determining a discard probability for a particular egress queue includes:
  (a) setting a temporary average number of received traffic bytes to the average number of received traffic bytes;
  (b) setting a temporary discard probability equal to a time average of previous values of the discard probability for the particular egress queue;
  (c) determining an allocated traffic bandwidth for the particular egress queue;
  (d) comparing the temporary average number of received traffic bytes to the allocated traffic bandwidth for the particular egress queue;
  (e) if the temporary average number of received traffic bytes is greater than the allocated traffic bandwidth for the particular egress queue, adding to the temporary discard probability a positive probability increment and adding to the temporary average number of received traffic bytes a negative bandwidth increment;
  (f) if the temporary average number of received traffic bytes is less than the allocated traffic bandwidth for the particular egress queue, adding to the temporary discard probability a negative probability increment and adding to the temporary average number of received traffic bytes a positive bandwidth increment; and
  (g) setting the discard probability for the particular egress queue to the temporary discard probability.

7. A method as defined in claim 6, further including performing steps (d), (e) and (f) a pre-determined number of times.

8. A method as defined in claim 6, further including performing steps (d), (e) and (f) until the temporary average number of received traffic bytes is within a desired range of the allocated traffic bandwidth for the particular egress queue.

9. A method as defined in claim 8, further including measuring a depth of the particular egress queue and performing steps (d), (e) and (f) until the depth of the particular egress queue is within a desired range.

10. A method as defined in claim 9, further including measuring a variability of the depth of the particular egress queue and performing steps (d), (e) and (f) until the variability of the depth of the particular egress queue is within a desired range.

11. A method as defined in claim 6, further including performing steps (d), (e) and (f) until the temporary discard probability for the particular egress queue converges to a desired precision.

12. A method as claimed in claim 6, wherein determining an allocated traffic bandwidth for the particular egress queue includes:
  determining an average number of traffic bytes that would be received at the particular egress queue if the discard probability for the particular egress queue were zero; and
  if the average number of traffic bytes that would be received at the particular egress queue if the discard probability for the particular egress queue were zero is greater than the allocated traffic bandwidth for the particular queue, adding a positive increment to the allocated traffic bandwidth for the particular egress queue;
  if the average number of traffic bytes that would be received at the particular egress queue if the discard probability for the particular egress queue were zero is less than the allocated traffic bandwidth for the particular queue, adding a negative increment to the allocated traffic bandwidth for the particular egress queue.

13. A method as claimed in claim 6, further comprising:
  determining an available traffic bandwidth for all egress queues connected to the particular output port; and
  determining a total traffic bandwidth allocated for all egress queues connected to the particular output port;
  wherein the step of adding a positive increment to the allocated traffic bandwidth for the particular egress queue is executed only if the total traffic bandwidth allocated for all egress queues connected to the particular output port is less than the available traffic bandwidth for all egress queues connected to the particular output port.

14. A method as claimed in claim 13, wherein determining an available traffic bandwidth for all egress queues connected to the particular output port includes:
  determining a bandwidth gradient that is indicative of a rate at which the available traffic bandwidth for all egress queues connected to the particular output port is to be increased or decreased;
  increasing or decreasing the available traffic bandwidth for all egress queues connected to the particular output port as a function of the bandwidth gradient.

15. A method as claimed in claim 14, wherein obtaining bandwidth utilization information regarding packets received at the egress queues further includes determining, for each particular one of the at least one output port, an average number of non-traffic bytes received per time unit from the particular output port, and wherein determining an available traffic bandwidth for all egress queues connected to the particular output port further includes:
  determining a total link capacity available for all the egress queues connected to the particular output port;

setting a maximum available traffic bandwidth to the difference between said total link capacity and said average number of non-traffic bytes;
wherein the available traffic bandwidth for all egress queues connected to the particular output port is bounded above by the maximum available traffic bandwidth.

16. A method as claimed in claim 15, wherein determining the average number of traffic bytes that would be received at the particular egress queue if the discard probability for the particular egress queue were zero includes evaluating a function of the average number of traffic bytes received per time unit for the particular egress queue and the time average of previous values of the discard probability for the particular egress queue.

17. A method as claimed in claim 16, wherein the function is the quotient between (i) the average number of traffic bytes received per time unit for the particular egress queue and (ii) the difference between unity and the time average of previous values of the discard probability for the particular egress queue.

18. A method as claimed in claim 6, further comprising:
determining an average number of traffic bytes that would be received at the particular egress queue if the discard probability for the particular egress queue were zero; and
performing steps (d), (e) and (f) at least twice;
wherein the positive bandwidth increment is a first fraction of average number of traffic bytes that would be received at the particular egress queue if the discard probability for the particular egress queue were zero, said first fraction decreasing with subsequent executions of step (f); and
wherein the negative bandwidth increment is a second fraction of average number of traffic bytes that would be received at the particular egress queue if the discard probability for the particular egress queue were zero, said second fraction decreasing with subsequent executions of step (e).

19. A method as claimed in claim 18, wherein the positive probability increment has a value that decreases with subsequent executions of step (e) and wherein the negative probability increment has a value that decreases with subsequent executions of step (f).

20. A method as defined in claim 14, wherein obtaining bandwidth utilization information regarding packets received at the egress queues includes determining, for each particular one of the at least one output port, an average idle time between successive packets received from the particular output port.

21. A method as claimed in claim 20, wherein determining a bandwidth gradient includes:
comparing the average idle time between successive packets received from the particular output port to a first threshold; and
if the average idle time between successive packets received from the particular output port is below the first threshold, setting the bandwidth gradient to indicate a first rate of decrease in the available traffic bandwidth for all egress queues connected to the particular output port.

22. A method as claimed in claim 21, further comprising:
comparing the average idle time between successive packets received from the particular output port to a second threshold less than the first threshold; and
if the average idle time between successive packets received from the particular output port is below the second threshold, setting the bandwidth gradient to indicate a second rate of decrease in the available traffic bandwidth for all egress queues connected to the particular output port, wherein said second rate of decrease is greater than said first rate of decrease.

23. A method as claimed in claim 22, further comprising:
comparing the average idle time between successive packets received from the particular output port to a third threshold; and
if the average idle time between successive packets received from the particular output port is above the third threshold, setting the bandwidth gradient to indicate a rate of increase in the available traffic bandwidth for all egress queues connected to the particular output port.

24. A method as claimed in claim 23, further comprising:
determining a degree of memory utilization within the plurality of egress queues; and
programming at least one of the first, second and third threshold as a function of said degree of memory utilization.

25. A method as claimed in claim 1, wherein the at least one output port of the processing fabric is a plurality of output ports and wherein each of the plurality of output ports is connected to a respective one of the plurality of egress queues.

26. A method as claimed in claim 1, wherein at least one of the at least one output port of the processing fabric is connected to a respective plurality of the plurality of egress queues.

27. A method as claimed in claim 1, wherein providing the discard probability associated with each egress queue to the control entity is executed on a programmable basis.

28. A method as claimed in claim 1, further comprising:
recording the discard probability associated with each egress queue at selected times;
detecting whether a change of at least a pre-determined magnitude has occurred in the discard probability associated with at least one of the egress queues;
wherein providing the discard probability associated with a particular one of the egress queues to the control entity is executed only if a change of at least the pre-determined magnitude has been detected in the discard probability associated with the particular egress queue.

29. A method as claimed in claim 1, further comprising:
recording the discard probability associated with each egress queue at selected times;
detecting whether a change of at least a pre-determined magnitude has occurred in the discard probability associated with at least one of the egress queues;
wherein providing the discard probability associated with a particular one of the egress queues to the control entity is executed either (i) if a change of at least the pre-determined magnitude has been detected in the discard probability associated with the particular egress queue; or (ii) after a pre-determined amount of time regardless of whether or not a change of at least the pre-determined magnitude has been detected in the discard probability associated with the particular egress queue.

30. A method as claimed in claim 1, further comprising:
for each received packet, the control entity determining an egress queue for which the received packet is destined and either transmitting or not transmitting the received packet to the processing fabric on the basis of the discard probability associated with the egress queue for which the received packet is destined.

31. A method as claimed in claim 30, wherein either transmitting or not transmitting the received packet to the processing fabric on the basis of the discard probability associated with the egress queue for which the received packet is destined includes:

generating a random number for the received packet;

comparing the random number to the discard probability associated with the egress queue for which the received packet is destined; and transmitting or not transmitting the received packet to the processing fabric on the basis of the comparison.

32. A method as claimed in claim 31, wherein not transmitting a received packet includes discarding the packet.

33. A method as claimed in claim 31, wherein not transmitting a received packet includes marking the packet as discardable.

34. A method as claimed in claim 31, wherein not transmitting a received packet includes storing the received packet in a memory location and marking the received packet as discardable, and wherein transmitting a received packet includes transmitting only those packets not marked as discardable.

35. A method as claimed in claim 34, wherein not transmitting a received packet further includes:

determining whether there exists a condition of reduced congestion at the egress queues; and if there exists a condition of reduced congestion at the egress queues, determining whether the memory location needs to be used to store another packet and, if not, unmarking the packet as discardable.

36. A non-transitory computer-readable storage medium containing program instructions for causing execution in a computing device of a method as defined in claim 1.

37. A drop probability evaluation module for use in a physical device having (i) a processing fabric with at least one input port and at least one output port; (ii) a control entity connected to the at least one input port for regulating packet flow thereto; and (iii) a plurality of egress queues connected to the at least one output port for temporarily storing packets received therefrom, said drop probability evaluation module comprising:

means for obtaining at a physical processing entity, bandwidth utilization information regarding packets received at the egress queues, wherein obtaining said bandwidth utilization information includes determining the amount of bandwidth consumed by packets received at each of said egress queues;

means for determining, from the bandwidth utilization information and the amount of bandwidth consumed by packets received at each of said egress queues, a discard probability associated with each egress queue; and means for providing the discard probability associated with each egress queue to the control entity, for use by the control entity in selectively transmitting packets to the at least one input port of the processing fabric.

38. A drop probability evaluation module for use in a physical device having (i) a processing fabric with at least one input port and at least one output port; (ii) a control entity connected to the at least one input port for regulating packet flow thereto; and (iii) a plurality of egress queues connected to the at least one output port for temporarily storing packets received therefrom, said drop probability evaluation module including:

an allocation processing entity, for determining an allocated traffic bandwidth for each of the egress queues; and a probability processing entity in communication with the allocation processing entity, said probability processing entity being adapted to receive the allocated traffic bandwidth for each of the egress queues from the allocation processing entity and also adapted to receive an average number of received traffic bytes, per time unit, for each of the egress queues from an external entity, the probability processing entity being operable to:

compare the average number of received traffic bytes for each particular one of the egress queues to the allocated traffic bandwidth for the particular egress queue; and set the discard probability for the particular egress queue to the sum of a time average of previous values of the discard probability for the particular egress queue and either a positive or a negative increment, depending on whether the average number of received traffic bytes for the particular egress queue is greater or less than the allocated traffic bandwidth for the particular egress queue.

39. A non-transitory computer-readable storage medium containing a program element for execution by a computing device to implement the drop probability evaluation module of claim 38.

40. An apparatus, comprising:

a processing fabric having at least one input port and at least one output port, the processing fabric being adapted to process packets received from the at least one input port and forward processed packets to the at least one output port;

a plurality of egress queues, each connected to a corresponding one of the at least one output port of the processing fabric, each egress queue being adapted to (i) temporarily store packets received from the corresponding output port of the processing fabric and (ii) determine bandwidth utilization information on the basis of the packets received at the egress queues, by determining the amount of bandwidth consumed by packets received at each of said egress queues;

a drop probability evaluation module connected to the egress queues, said drop probability evaluation entity being adapted to determine a discard probability associated with each of the egress queues on the basis of the bandwidth utilization information and the amount of bandwidth consumed by packets received at each of said egress queues; and a packet acceptance unit connected to the at least one input port of the processing fabric and to the drop probability evaluation module, the packet acceptance entity being adapted to (i) receive packets destined for the at least one output port of the processing fabric; (ii) identify an egress queue associated with each received packet; and (iii) on the basis of the discard probability associated with the egress queue associated with each received packet, either transmit or not transmit said received packet to one of the at least one input port of the processing fabric.

41. Apparatus as claimed in claim 40, wherein the at least one output port is a plurality of output ports, the apparatus further comprising:

a plurality of output line cards, each output line card connected to a distinct subset of the plurality of output ports of the processing fabric;

wherein a portion of the drop probability evaluation module is provided on each of the output line cards;

wherein the portion of the drop probability evaluation module provided on a particular one of the output line cards is the portion of the drop probability evaluation module connected to those egress queues that are connected to the subset of the plurality of output ports of the processing fabric to which the particular output line card is connected.

42. Apparatus as claimed in claim 41, wherein the at least one input port is a plurality of input ports further comprising:
a plurality of input line cards, each input line card being connected to a, distinct subset of the plurality of input ports of the processing fabric;
wherein a portion of the packet acceptance unit is provided on each of the input line cards.

43. Apparatus as defined in claim 40, wherein the processing fabric is a switch fabric.

44. A method as defined in claim 1, wherein each packet has a corresponding priority selected from a group of priorities, said method comprising:
determining, from the bandwidth utilization information, a discard probability associated each of the priorities; and
providing the discard probability associated with each egress queue and priority to the control entity, for use by the control entity in selectively transmitting packets to the at least one input port of the processing fabric.

45. A method as claimed in claim 44, further comprising:
for each received packet, the control entity determining an egress queue for which the received packet is destined and the priority of the packet and either transmitting or not transmitting the received packet to the processing fabric on the basis of the discard probability associated with the egress queue for which the received packet is destined and the priority of the packet.

46. A method of regulating packet flow through a physical device having an ingress entity, an egress entity, a processing fabric between the ingress entity and the egress entity, and a control entity adapted to process packets prior to transmission thereof to the ingress entity, said method comprising:
obtaining at a physical processing entity, congestion information regarding packets received at the egress entity, wherein obtaining said congestion information includes determining the amount of bandwidth consumed by packets arriving at the egress entity; and
providing the congestion information to the control entity, for use by the control entity in processing packets prior to transmission thereof to the ingress entity.

47. A method as defined in claim 46, further comprising:
for each packet received at the control entity, either transmitting or not transmitting the received packet to the ingress entity, on the basis of the congestion information.

48. A method as defined in claim 47, wherein not transmitting the received packet to the ingress entity includes discarding the received packet.

49. A method as defined in claim 47, wherein not transmitting the received packet to the ingress entity includes storing the packet in a memory location.

50. A method as defined in claim 47, wherein not transmitting the received packet to the ingress entity includes rerouting the packet along an alternate route.

51. A method as defined in claim 46, further comprising:
for each packet received at the control entity, either marking or not marking the received packet prior to transmission to the ingress entity, on the basis of the congestion information.

52. A method as defined in claim 46, wherein obtaining congestion information regarding packets received at the egress entity includes determining a discard probability.

53. A method as defined in claim 52, further including:
generating a quantity for each packet received at the control entity;
comparing the quantity to the discard probability; and
either transmitting or not transmitting the received packet to the ingress entity on the basis of the outcome of the comparing step.

54. A method as defined in claim 53, wherein the quantity is a random number.

55. A method as defined in claim 46, wherein the egress entity includes a plurality of egress queues and wherein the congestion information includes an occupancy of each of the egress queues.

56. A method as defined in claim 55, wherein the egress entity includes a plurality of egress queues and wherein the congestion information includes a variability in the occupancy of each of the egress queues.

* * * * *